United States Patent Office 3,652,546
Patented Mar. 28, 1972

3,652,546
ESTERS OF 6-AMINOPENICILLANIC ACID
Lee C. Cheney, Fayetteville, John C. Godfrey, Syracuse, Leonard B. Crast, Jr., North Syracuse, and Joyce R. Luttinger, Syracuse, N.Y., assignors to Bristol-Myers Company, New York, N.Y.
No Drawing. Filed July 22, 1965, Ser. No. 474,155
Int. Cl. C07d 99/14
U.S. Cl. 260—239.1
13 Claims

ABSTRACT OF THE DISCLOSURE

Activated esters of 6-aminopenicillanic acid are useful as intermediates in the production of penicillins.

---

This invention relates to certain novel and highly useful activated esters of 6-aminopenicillanic acid (and salts thereof) and to methods both for their preparation and for their use to make both old and new penicillins.

Various penicillins have been widely used as antibacterial agents, particularly in certain infectious bacterial diseases in mammals and as animal feed supplements. A limited number of such penicillins were first prepared by direct fermentation, preferably with added side-chain precursors. Many more were later prepared by acylation of 6-aminopenicillanic acid (e.g. Doyle et al., U.S. Pats. 2,941,995, 3,047,467, 3,164,404) which in turn was prepared by precursor-free fermentation or by enzymatic cleavage of natural penicillins. In addition, a few penicillins hav been prepared by chemical synthesis (e.g. Sheehan, U.S. Pat. 3,159,617).

It was the primary objective of the present invention to provide new intermediates for use in the production of penicillins which would offer alternative routes to old penicillins (and in particular provide practical, commercial-scale methods for producing certain penicillins previously available only in laboratory quantities) and would also make possible the synthesis of novel penicillins not attainable by the methods presently available.

The primary objective of the present invention was achieved by the provision, according to the present invention, of activated esters of 6-aminopenicillanic acid and acid addition salts thereof.

The activated esters of 6-aminopenicillanic acid included within the scope of the present invention are those which by simple test are stable enough to avoid self-condensation but at the same time are labile enough to allow the carboxyl-protecting function, i.e., the ester group, to be removed when desired to regenerate the carboxyl group without destroying the sensitive β-lactam ring photochemically as described below or by treatment with sodium thiophenoxide in an inert solvent according to Sheehan et al., J. Org. Chem. 29, 2006 (1964). This removal of the ester group is to be practiced on these esters themselves (to produce 6-aminopenicillanic acid) or after they have been acylated (to produce a penicillin).

These activated esters were found to have such advantages (over use in former syntheses of 6-aminopenicillanic acid itself or its salts) as vastly improved solubility in organic solvents, greater thermal stability and improved stability toward acidic reagents in additiond to their use as previously mentioned and exemplified below to make otherwise unobtainable, new penicillins and to make penicillins such as 6 - (α-guanidinophenylacetamido)penicillanic acid which were previously prepared only in very low yield by a most expensive and complicated process (cf. Belgian Pat. 634,374).

More specifically, the primary objective of the present invention was achieved by the provision, according to the present invention of activated esters of 6-aminopenicillanic acid of the formula

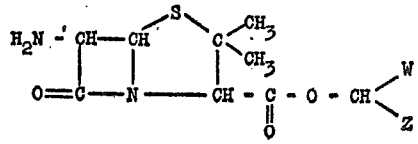

wherein, when W represents hydrogen, Z represents
(a) alkanoyl, e.g. acetyl, propionyl, n-butyryl, n-decanoyl;
(b) aroyl, e.g. benzoyl, 1-naphthoyl, 2-furoyl, 2-thenoyl;
(c) substituted aroyl and especially mono-substituted benzoyl, e.g. p-nitrobenzoyl, p-aminobenzoyl, p-methylbenzoyl, halobenzoyls, 3,4-dihydroxybenzoyl, p-phenylbenzoyl, p-methanesulfonylbenzoyl;
(d) N-phthalimido, N-succinimido, N-saccharino, which has the formula

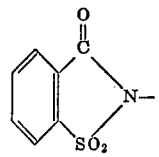

N,N-dialkylcarbamoyl, e.g. N,N-diethylcarbamoyl, N-alkylcarbamoyl;
(e) cyano;
(f) alkoxy, e.g. methoxy; alkylthio, e.g. methylmercapto; aryloxy, e.g. phenoxy;
(g) carbalkoxy, e.g. carbethoxy (from the ethyl bromoacetate);
(h) carbobenzoxy, e.g. from benzyl chloroacetate;
(i) carbamoyl, e.g. from α-chloroacetamide;
(j) benzoyloxy, e.g. from bromomethyl benzoate, chlorobenzoyloxy;
(k) carbophenoxy, e.g. from phenyl chloroacetate;
(l) carbo-tert.-butoxy, e.g. from tert.-butyl bromoacetate;
(m) alkylsulfonyl, e.g. from chloromethyl sulfone; and, when W represents carbalkoxy, Z represents carbalkoxy, e.g. from diethyl bromomalonate; and, when W represents phenyl, Z represents benzoyl (giving desyl) or cyano; and, when W represents (lower)alkyl, Z represents (lower) alkanoyl, e.g. from 3-bromo-2-butanone; or wherein W and Z taken together represent 2-oxocycloalkyl containing 4 to 8 carbon atoms inclusive, e.g. from 2-chlorocyclohexanone; and acid addition salts thereof.

The preferred embodiments of the present invention are the activated esters of 6-aminopenicillanic acid of the formula

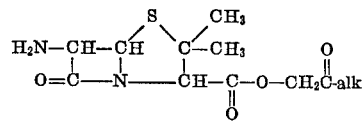

wherein alk represents (lower)alkyl, and especially methyl, and the acid addition salts thereof and the activated esters of 6-aminopenicillanic acid of the formula

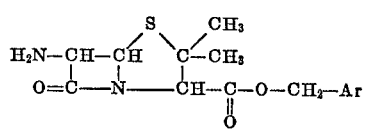

wherein Ar represents, benzoyl, naphthoyl, furoyl, thenoyl, nitrobenzoyl, halobenzoyl, methylbenzoyl, methanesulfonylbenzoyl or phenylbenzoyl and acid addition salts thereof.

There is also provided, according to the present invention, the process of preparing activated esters of 6-aminopenicillanic acid which comprises deacylating the corresponding activated ester of a biosynthetic penicillin with an amidase, and more particularly, the process of preparing activated esters of 6-aminopenicillanic acid of the formula

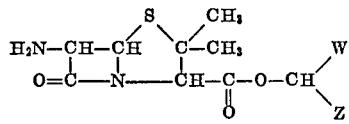

wherein, when W represents hydrogen, Z represents (lower)alkanoyl, benzoyl, naphthoyl, furoyl, thenoyl, nitrobenzoyl, methylbenzoyl, halobenzoyl, phenylbenzoyl, N-phthalimido, N-succinimido, N-saccharino, N-(lower)alkylcarbamoyl, cyano, (lower)alkoxy, (lower)alkylthio, phenoxy, carbalkoxy, carbobenzoxy, carbamoyl, benzyloxy, chlorobenzyloxy, carbophenoxy, carbo-tert. butoxy or (lower)alkylsulfonyl and, when W represents carbalkoxy, Z represents carbalkoxy and, when W represents phenyl, Z represents benzoyl or cyano or wherein W and Z taken together represent 2-oxo-cycloalkyl containing 4 to 8 carbon atoms inclusive; and acid addition salts thereof, which comprises deacylating the corresponding activated ester of a biosynthetic penicillin with an amidase.

A preferred embodiment is the process of preparing activated esters of 6-aminopenicillanic acid of the formula

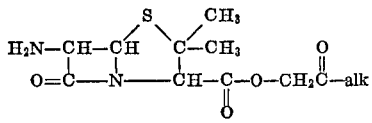

wherein alk represents (lower)alkyl, which comprises deacylating the corresponding activated ester of penicillin G or penicillin V with the amidase of *E. coli*; another preferred embodiment is the process of preparing activated esters of 6-aminopenicillanic acid of the formula

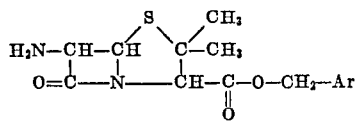

wherein Ar represents benzoyl, naphthoyl, furoyl, thenoyl, nitrobenzoyl, halobenzoyl, methylbenzoyl, methanesulfonylbenzoyl or phenylbenzoyl and acid addition salts thereof, which comprises deacylating the corresponding activated ester of penicillin G or penicillin V with the amidase of *E. coli*.

The activated esters of 6-aminopenicillanic acid of the present invention are prepared by a two-step general method, as follows:

A freely available, biosynthetic penicillin such as penicillin G or V in the form of a salt, e.g. the sodium or potassium salt, is reacted (preferably at about room temperature up to about 40° C. in an anhydrous solvent such as dimethylformamide or N,N-dimethylacetamide) with one equivalent of an active halide of the formula

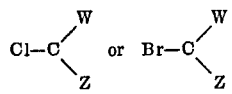

wherein W and Z have the meaning set forth above to produce an activated ester of the pencillin (cf. McDuffie et al., U.S. Pat. 2,578,570) from which the side-chain is then removed by the enzymatic process previously used on penicillins G and V themselves (cf. Rolinson et al., U.S. Pats. 3,014,845 and 3,014,846; U.S. Pat. 3,239,428. issued Mar. 8, 1966 on application Ser. No. 363,999, filed Apr. 30, 1964 by our colleagues H. Takeda, I. Iwatsuki and T. Miyano; U.S. Pats. 3,161,573; 3,150,059; 3,144,395; 3,127,326; 3,121,667; 3,116,218 and 3,109,779; British patent specifications 891,173, 897,617, 924,455 and 957,685).

The preferred procedure uses chloroacetone or bromoacetone and either penicillin G or penicillin V. The other preferred procedure uses phenacyl bromide, phenacyl chloride or a ring-substituted phenacyl bromide or chloride.

Alternatively, the activated esters of natural penicillins can be prepared by treatment of a mixed anhydride of the penicillin with an alcohol of the formula

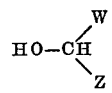

wherein W and Z have the meaning set forth above essentially by following well-known procedures; cf. D. A. Johnson, J. Amer. Chem. Soc. 75, 3636 (1953); R. L. Barnden et al., J. Chem. Soc. 3733 (1953).

The activated esters of 6-aminopenicillanic acid of the present invention are also prepared, as exemplified below, by the following method:

6-aminopenicillanic acid in the form of a salt such as the triethylammonium salt is mixed at about 20–40° C. in an inert solvent such as methylene chloride or dimethylformamide with about one or two equivalents of one of the active halides described above to form the desired activated ester of 6-aminopenicillanic acid, which is conveniently isolated as its acid addition salt with p-toluenesulfonic acid.

A third procedure for the preparation of the activated esters of 6-aminopenicillanic acid comprises, as exemplified below, the treatment with p-toluenesulfonic acid monohydrate of an activated ester made from 6-(N-tritylamino)penicillanic acid and an alcohol of the formula

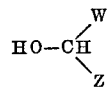

wherein W and Z have the meaning set forth above. The reaction is carried out in an inert solvent such as dry acetone at a temperature in the range of 0–40° C., and preferably at about room temperature, using approximately equimolar weights of ester and acid.

The activated esters of 6-aminopenicillanic acid of the present invention are basic compounds, i.e. primary amines, and form acid addition salts upon treatment with one equivalent of organic or inorganic acids such as hydrochloric sulfuric, sulfamic, hydrobromic, tartaric, hydriodic, glycolic, citric, maleic, phosphoric, succinic, acetic and the like. Such salts need not be nontoxic or pharmaceutically acceptable as their primary utility is in the recovery of these products for use in later reactions, e.g. acylation, in which the acid cation does not appear in the final product.

When desired, the products of the present invention are converted as exemplified below to the corresponding activated esters of 6-acylaminopenicillanic acids by reaction with an acylating agent for a primary amine, i.e., with an acid chloride of the formula

or the functional equivalent of said acid chloride as an acylating agent for a primary amino group. Such equivalents include the corresponding carboxylic acid bromides, acid anhydrides, including mixed anhydrides and particularly the mixed anhydrides prepared from stronger acids such as the lower aliphatic monoesters of carbonic acid of alkyl and aryl sulfonic acids and of more hindered acids such as diphenylacetic acid. In addition, an acid azide or an active ester or thioester (e.g. with p-nitrophenol, thiophenol, thioacetic acid) may be used or the free acid itself may be coupled with the activated ester by the use of enzymes or of a carbodiimide reagent [cf. Sheehan and Hess, J. Amer. Chem. Soc. 77, 1067 (1955)], or of alkynylamine reagent [cf. R. Buijle and H. G. Viehe, Angew. Chem. International Edition 3, 582 (1964)], or of a ketenimine reagent [cf. C. L. Stevens and M. E. Monk, J. Amer. Chem. Soc. 80, 4065 (1958)] or of an isoxazolium salt reagent [cf. R. B. Woodward, R. A. Olofson and H. Mayer, J. Amer. Chem. Soc. 83, 1010 (1961)]. Another equivalent of the acid chloride is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated but this is not essential. In such instances, R represents any desired radical which will become the side-chain of the ultimate penicillin (in the sense that the benzyl group is the side-chain of penicillin G) which is formed on subsequent removal of the activated ester group to liberate the free carboxyl. Acylation with a free acid and the carbodiimide reagent is particularly useful as it is effective with acids which cannot be converted easily or at all to acid halides or acid anhydrides. These reactions are preferably carried out at about 0-25° C. in an anhydrous, inert solvent such as dry acetone using the free base form of the activated ester of 6-aminopenicillanic acid, which may be prepared in situ from a salt thereof if desired. In addition to the acylating agent, a mole of a base such as triethylamine is added if acid is liberated, as by use of an acid chloride or anhydride. The product is then isolated by conventional techniques, e.g. by removal of the solvent followed by solvent recrystallization.

Thus in a typical illustration of the carbodiimide procedure, 0.5 millimole of phenacyl 6-aminopenicillanate (free base) and 0.5 millimole of dicyclohexylcarbodiimide are dissolved in 3.0 ml. of methylene chloride. To this solution there is added a solution in 1.0 ml. pure dimethylformamide of 0.5 millimole of α-guanidinophenylacetic acid hydrochloride. After standing at 25° C. for 30 minutes the insoluble dicyclohexylurea is removed by filtration. Dilution of the filtrate with 50-75 ml. of dry ether then precipitates the product phenacyl α-guanidinobenzylpenicillin hydrochloride.

The activated esters of 6-acylaminopenicillanic acids thus obtained are then cleaved by Sheehan's sodium thiophenoxide method to the sodium salts of the corresponding penicillins. To each mole of the former there is added about one or two moles of sodium thiophenoxide dissolved in a dry inert solvent such as dimethylformamide or dimethyl sulfoxide. The mixture is stirred at about room temperature until the reaction is completed (which often requires less than one hour) and the penicillin so-produced is recovered in the conventional manner, e.g. by solvent extraction based on the acidic nature of the carboxyl group or by direct precipitation upon addition of acetone, ethyl acetate or the like. Temperatures as low as 5° C. are useful but require longer reaction times and often give lower yields than are obtained at 20-35° C., or, preferably, at about 25° C.

The activated esters of 6-acylaminopenicillanic acids can also be converted to the corresponding penicillins by cautious treatment with other bases such as sodium hydroxide or sodium acetate or by exposure to ultra-violet light as exemplified below.

The same methods can be used to convert to 6-aminopenicillanic acid itself the activated esters of 6-aminopenicillanic acid obtained by the consecutive steps of forming an activated ester of a natural penicillin and then enzymatically removing its side chain.

The activated esters of 6-aminopenicillanic acid of the present invention are also valuable starting materials for the preparation of biologically active derivatives of 7-aminocephalosporanic acid according to the following reaction scheme in which W and Z have the meaning set forth above and preferably W represents hydrogen and Z represents N-phthalimido:

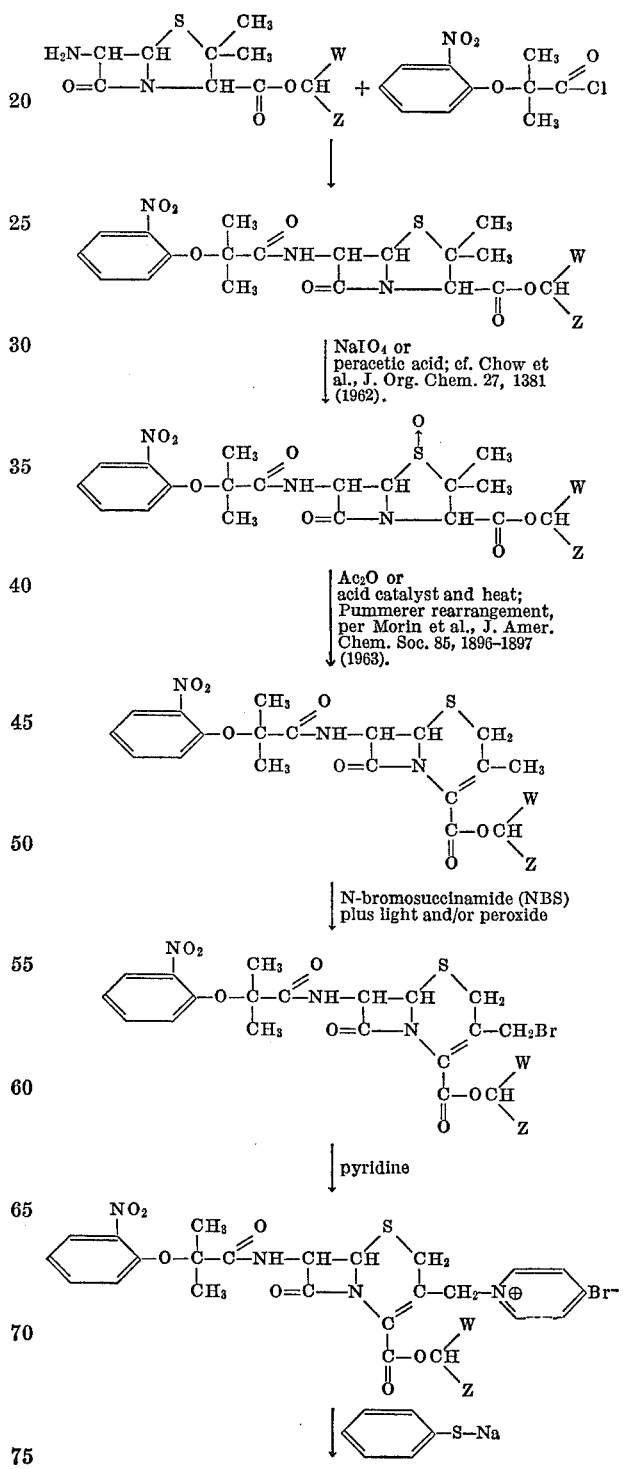

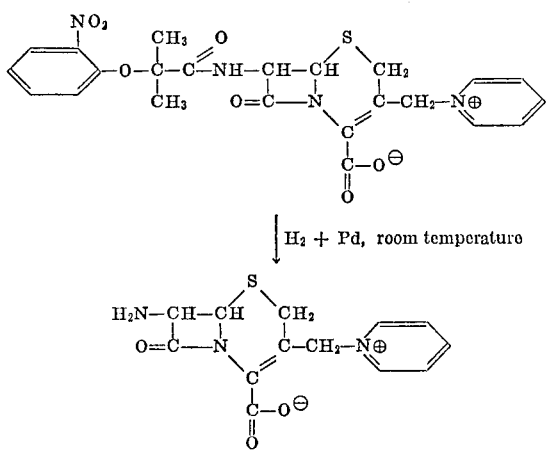

There is thus prepared the cephaloridine nucleus which can be acylated and/or transformed into other compounds of the cephalosporin family by the methods set forth in the art. An additional example of such transformations is the following, in which any penicillin having an unreactive sidechain (R) is first prepared as above in the form of an activated ester of its sulfoxide and then converted to corresponding derivatives of the cephalosporin series as follows:

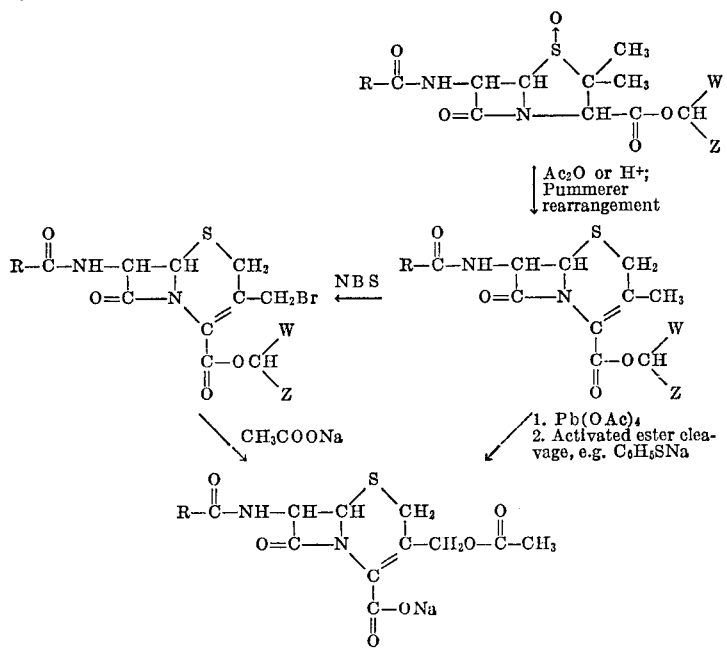

It was a secondary objective of the present invention to provide a potolytic method of converting activated esters of penicillins (or of 6-aminopenicillanic acid itself) to the corresponding penicillins (or to 6-aminopenicillanic acid itself) in order to obtain the advantages of a process which does not involve either heat or acid or base or active reagents and can therefore be applied to compounds having side-chains sensitive to such factors. These objectives were achieved by the provision, according to the present invention, of the process of producing penicillins which comprises subjecting to ultraviolet light in a solvent an activated ester of the corresponding N-acylated-6-aminopenicillanic acid and recovering the so-produced penicillin. In the preferred embodiments of this process the ester is derived from the alcohol of the formula

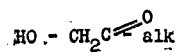

wherein alk represents (lower)alkyl, or the alcohol of the formula

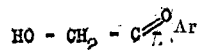

wherein Ar represents benzoyl, naphthoyl, furoyl, thenoyl, nitrobenzoyl, halobenzoyl, methylbenzoyl, phenylbenzoyl or methylsulfonylbenzoyl. Thus, this photolysis is conducted in tetrahydrofuran or dioxane, for example, at a temperature of 0–30° C. and preferably about 8° C. using a mercury or xenon arc lamp and preferably light of 250–300 mµ wavelength.

It was a further objective of the present invention to provide novel penicillins of value as antibacterial agents, as nutritional supplements in animal feeds, as agents for the treatment of mastitis in cattle and as therapeutic agents in poultry and animals, including man, in the treatment of infectious diseases caused by Gram-positive bacteria and Gram-negative bacteria and, especially, by benzylpenicillin-resistant strains of *Staphylococcus aureus micrococcus pyogenes* var. *aureus*) or for the decontamination of objects bearing such organisms, e.g. hospital equipment, walls of operating rooms and the like. That objective of the present invention was achieved by the provision, according to the present invention, of penicillins of the formula

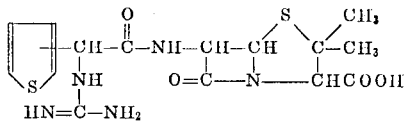

and nontoxic, pharmaceutically acceptable salts thereof.

The preferred embodiment is the penicillin of the formula

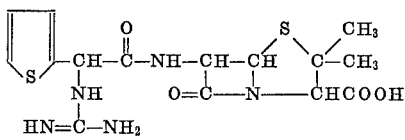

and nontoxic, pharmaceutically acceptable salts thereof. Such salts include the nontoxic carboxylic acid salts thereof, including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, N-(lower)alkylpiperidine, e.g., N-ethylpiperidine and other amines which have been used to form salts with benzylpenicillin; and the nontoxic acid addition salts thereof (i.e. the imine salts) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like. The α-carbon atom of the acyl group (to which the α-guanidino group is attached) is an asymmetric carbon atom and the compounds of this invention can therefore exist in two optically active isomeric forms [the D-(—) and L-(+) diastereoisomers] and as a mixture of the two optically active forms; all such isomeric forms of the compounds are included within the scope of the present invention.

It should be noted in connection with the foregoing consideration of the diastereoisomers of this invention, that many isomers other than the two caused by the asymmetric carbon of the side chain are possible due to the presence of asymmetric carbon atoms in the 6-aminopenicillanic acid nucleus. Such additional isomers, however, are not presently significant since 6-aminopenicillanic acid which is the product of fermentation processes is consistently of one configuration; such 6-aminopenicillanic acid is presently used in the production of the compounds of this invention.

STARTING MATERIALS

Examples of the preparation of useful starting materials for making the activated esters of 6-aminopenicillanic acid are as follows. In the title of each preparation the moiety

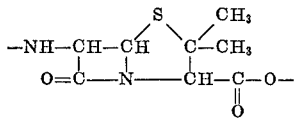

is represented simply by "—APA—".

Preparation No. 1

Phenacyl 6-phenoxyacetamidopenicillanate: Potassium penicillin V (19.4 g.; 0.05 mole) and phenacyl chloride (7.70 g.; 0.05 mole) were suspended in dimethylacetamide, stirred for 22 hours at 22° C. and poured into three liters of dilute brine to precipitate the phenacyl ester of penicillin V as a gum. This product was adsorbed from the aqueous solution on diatomaceous earth which was collected by filtration and sucked dry on the filter after thorough washing. The product was eluted from the diatomaceous earth with 600 mls. acetone which was filtered and concentrated by distillation in vacuo at 33° C. The residue was dissolved in 300 ml. ether and dried with sodium sulfate. The solvent was removed by distillation in vacuo to leave solid product which was three times dissolved in ethyl acetate and distilled dry in vacuo to leave the product, phenacyl 6-phenoxyacetamidopenicillanate, as 21.1 g. of a glassy solid.

Preparation No. 2

$(C_6H_5)_3C$—APA—K

Potassium 6 - (N - tritylamino)penicillanate: 6-aminopenicillanic acid (60.0 g., 0.278 m.) was dissolved in a mixture of water (220 ml.), isopropyl alcohol (440 ml.) and triethylamine (105.0 ml.) and stirred 5 minutes at room temperature. To this solution there was added trityl chloride (100.0 g., 0.36 m.) in portions over 30 minutes. The reaction mixture was stirred 4 hours at room temperature and then stirred another 15 minutes after adding 1200 ml. water. The cloudy suspension was filtered. The filtrate was covered with about one liter of ether and acidified to pH 2.6 with concentrated hydrochloric acid. The ether layer was removed and the acidic aqueous phase was extracted twice more with 200 ml. portions of ether. The combined ethereal extracts containing the product, 6-(N-tritylamino)penicillanic acid [6 - (N - triphenylmethylamino)penicillanic acid], were dried over $Na_2SO_4$, filtered and to them was added a solution in 200 ml. ether of 50.8 g. potassium 2-ethylhexanoate to precipitate potassium 6-(N-tritylamino)penicillanate as a heavy, gel-like solid which was collected by filtration, sucked dry using a rubber dam, dried in vacuo over $P_2O_5$ and found to weigh 27.7 g. The infrared spectrum of the product was consistent with the assigned structure. See also Sheehan and Henery-Logan, J. Amer. Chem. Soc. 81, 5838–5839 (1959) and 84, 2983–2990 (1962) at page 2989.

Preparation No. 3

Phenacyl 6-triphenylmethylaminopenicillanate: A solution of 12.42 g. (0.0250 mole) of potassium 6-triphenylmethylaminopenicillanate and 4.08 g. (0.0275 mole) of 2-chloroacetophenone in 315 ml. of N,N-dimethylacetamide (DMAc) was stirred at 25° C. for 5.0 hours. The mixture was poured into 2800 ml. of 5% sodium chloried solution and the precipitated solid was collected by filtration and dried. When it was then dissolved in 200 ml. of ether and scratched, 10.0 g. (69.4%) of product, phenacyl 6 - triphenylmethylaminopenicillanate, M.P. 198.0–200.0° C. precipitated and was collected by filtration and dried. It was recrystallized by dissolving in 300 ml. dry acetone, filtering, removing most of the solvent in vacuo at 33° C. and adding 100 ml. dry ether. The recovery was essentially quantitative and the analytical sample had an M.P. of 200.5–201.5° C. Its infrared spectrum in KBr exhibited an NH band at 3300 cm.$^{-1}$, a β-lactam carbonyl at 1790 cm.$^{-1}$, ester carbonyl at 1760 cm.$^{-1}$, phenyl ketone at 1710 cm.$^{-1}$ and a typical triphenylmethyl band at 707 cm.$^{-1}$. Its NMR spectrum in $CDCl_3$ had a complex pattern representing 20 aromatic protons at 8.0 to 7.0δ, an AB pattern centered at 5.3δ showing the two β-lactam protons, a resonance band at 4.45δ which included the proton at $C_3$ and the two protons next to the carbonyl group on the phenacyl moiety and two sharp bands at 1.62 and 1.50δ which arose from the six protons of the gem-dimethyl group at $C_2$.

Analysis. — Calc'd for $C_{35}H_{32}N_2O_4S$ (percent): C, 72.89; H, 5.59; N, 4.86. Found (percent): C, 72.75; H, 5.62; N, 4.78.

When 2-bromoacetophenone is used in place of 2-chloroacetophenone in the above procedure, the same product is obtained in comparable yield.

See also: J. C. Sheehan and G. D. Daves, Jr., J. Org. Chem. 29, 2006–2008 (1964).

Preparation No. 4

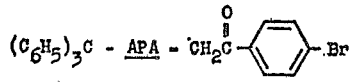

4'-bromophenacyl 6-triphenylmethylaminopenicillanate: A solution of 2.48 g. (5.00 millimole) of potassium 6-triphenylmethylaminopenicillanate and 1.53 g. (5.00 millimole) of 2,4'-dibromoacetophenone in 50 ml. of N,N-dimethylacetamide was stirred for 5.0 hours at 25° C. The mixture was poured into 500 ml. of 5% sodium chloride solution and the solid which separated was collected by filtration and washed with water. It was dissolved in ether, filtered and the solvent and moisture removed in vacuo, giving 3.15 g. (96%) of 4'-bromophenacyl 6-triphenylmethylaminopenicillanate as a brittle foam. It was recrystallized twice from hot ethyl alcohol, 1.74 g. (53%), M.P. 83–84°. Its infrared spectrum in KBr had the typical intense β-lactam at 1790 cm.$^{-1}$, ester carbonyl at 1765 cm.$^{-1}$ and phenyl ketone at 1710 cm.$^{-1}$.

*Analysis.*—Calc'd for $C_{35}H_{31}BrN_2O_4S$ (percent): C, 64.13; H, 4.74. Found (percent): C, 63.94; H, 4.88.

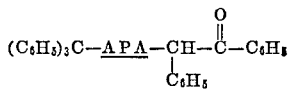

Desyl 6-triphenylmethylaminopenicillanate: A solution of 2.48 g. (5.00 millimole) of potassium 6-triphenylmethylaninopenicillanate and 1.65 g. (5.00 milimole) of 2-chlorodesoxybenzoin in 50 ml. of N,N-dimethylacetamide was stirred at 25° for 16 hours. The reaction mixture was poured into 500 ml. of 5% sodium chloride solution and the gummy solid which precipitated was collected by filtration. The gum was dried and washed thoroughly with Skellysolve B. Upon solution in a minimum of boiling ethanol and cooling in ice, 1.51 g. (46.5%) of desyl 6-triphenylmethylaminopenicillanate as a crystalline solid of M.P. 90° was obtained. The analytical sample was recrystallized twice more from ethanol, M.P. 109–110°. Its infrared spectrum in KBr showed the characteristic β-lactam at 1790 cm.$^{-1}$, ester carbonyl at 1755 cm.$^{-1}$ and phenyl ketone at 1705 cm.$^{-1}$.

*Analysis.*—Calcd for $C_{41}H_{36}N_2O_4S$ (percent): C, 75.43; H, 5.56; N, 4.29; S, 4.91. Found (percent): C, 75.44; H, 5.52; N, 4.18; S, 5.38.

Preparation No. 6

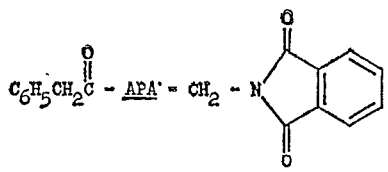

N-phthalimidomethyl 6-phenylacetamidopenicillanate: A suspension of 18.62 g. (0.0500 mole) of potassium penicillin G in 625 ml. of N,N-dimethylacetamide containing 12.00 g. (0.0500 mole) of N-bromomethylphthalimide very quickly gave a clear solution on stirring at 25°. It was stirred for 16½ hours and poured into 5 liters of 5% sodium chloride solution. The solid product, N-phthalimidomethyl 6-phenylacetamidopenicillanate, was collected by filtration and dried, yield 26.0 g. It was recrystallized from chloroform by the addition of n-pentane, yield 17.2 g. (69.8%), M.P. 74°. Its infrared spectrum (KBr) demonstrated that it had the expected structure, with β-lactam and first imide at 1790 cm.$^{-1}$, ester at 1760 cm.$^{-1}$, second imide at 1730 cm.$^{-1}$, imide at 1670 cm.$^{-1}$ and amide II at 1515 cm.$^{-1}$.

Preparation No. 7

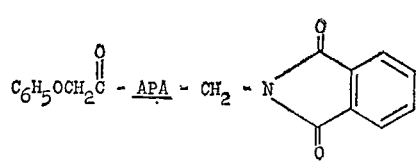

N-phthalimidomethyl 6-phenoxyacetamidopenicillanate: A suspension of 3.88 g. (0.0100 mole) of potassium penicillin V in 125 ml. of N,N-dimethylacetamide containing 2.40 g. (0.0100 mole) of N-bromomethylphthalimide was stirred at 25° for 16 hours. The reaction mixture was poured into one liter of 5% sodium chloride and the resulting amorphous solid was collected by filtration and dried, yield 5.01 g. (99%). It was dissolved in a minimum of chloroform and reprecipitated by the addition of Skellysolve B. The gummy precipitate of N-phthalimidomethyl 6-phenoxyacetamidopenicillanate was vacuum-dried to a brittle foam, yield 3.46 g. (68.2%). Its infrared and NMR spectra demonstrated unequivocally that it had the expected structure.

Preparation No. 8

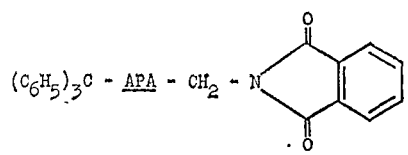

N-phthalimidomethyl 6-triphenylmethylaminopenicillanate: A mixture of 480 mg. (2.00 millimoles) of N-bromomethylphthalimide and 994 mg. (2.00 millimoles) of potassium 6-triphenylmethylaminopenicillanate in 25 ml. of N,N-dimethylacetamide was stirred for 5 hours at 25°. Dilution with 200 ml. of 5% sodium chloride precipitated the product, N-phthalimidomethyl 6-triphenylmethylaminopenicillanate, as a micro-crystalline solid. It was recrystallized twice from boiling ethanol, yield 530 mg. (43.1%), M.P. 110–111°. Its infrared spectrum (KBr) showed the β-lactam and one imide band at 1790 cm.$^{-1}$, ester carbonyl 1750 cm.$^{-1}$, the other imide at 1730 cm.$^{-1}$, ester C—O—C at 1200 cm.$^{-1}$, and the trityl band at 710 cm.$^{-1}$. Its NMR spectrum in $CDCl_3$ was completely consistent with the expected structure.

Preparation No. 9

Acetonyl 6-triphenylmethylaminopenicillanate: To a vigorously stirred suspension of 6.21 g. (12.5 m. mole) of potassium 6-triphenylmethylaminopenicillanate in 180 ml. of dimethylacetamide (DMAc) at room temperature (22°) was added 2.04 g. (22 mmole) of freshly-distilled chloroacetone. After three hours the mixture was added slowly to 1400 ml. of chilled (5°) and stirred 5% sodium chloride solution. The white, solid, acetonyl 6-triphenylmethylaminopenicillanate which separated was collected by filtration, washed with water and dried in vacuo over $P_2O_5$. It was recrystallized from an acetone-isopropanol-water mixture to yield 3.6 g. (56%) of colorless needles, M.P. 149–150°. The infrared spectrum had absorption maxima at 1785 cm.$^{-1}$ (β-lactam carbonyl), 1760 cm.$^{-1}$ (aliphatic ester), 1740 cm.$^{-1}$ (aliphatic ketone) and 715 cm.$^{-1}$ (triphenylmethyl-group). The structure assigned to the product was confirmed by the NMR spectrum.

Preparation No. 10

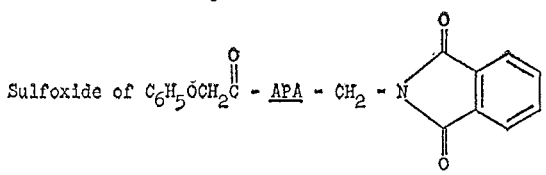

Phthalimidomethyl 6-phenoxyacetamidopenicillanate sulfoxide: Potassium penicillin V sulfoxide (3.8 g., 0.0094 mole) and N-bromomethylphthalimide (2.4 g.; 0.01 mole) were combined in 150 ml. dimethylacetamide and stirred overnight at room temperature. On dilution with 1300 ml. 5% aqueous sodium chloride the product, phthalimidomethyl 6-phenoxyacetamidopenicillanate sulfoxide, separated as a white solid which was collected by filtration.

Upon air-drying it began to turn to a gum and continued to do so upon storing overnight in a vacuum dessicator. Trituration with Skellysolve B restored the product to an off-white solid, 2.8 g., M.P. 99–102° C.

The reaction was repeated using 6.9 g. potassium penicillin V sulfoxide and 4.2 g. N-bromomethylphthalimide to yield 3.65 g. of phthalimidomethyl 6-phenoxyacetamidopenicillanate sulfoxide.

*Analysis.*—Calc'd for $C_{25}H_{23}N_3O_8S \cdot 2H_2O$ (percent): C, 53.35; H, 4.85. Found (percent): 53.62; H, 4.87.

The following examples are given in illustration of, but not in limitation of, the present invention. All temperatures are in degrees centigrade. In the title of each example "TSOH" represents p-toluene sulfonic acid. "Skellysolve B" is a petroleum ether fraction of B.P. 60–68° C. consisting essentially of n-hexane.

EXAMPLE 1

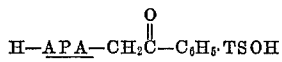

Phenacyl 6 - aminopenicillanate, p-toluenesulfonate salt: A solution of 2.88 g. (5.00 millimole) of phenacyl 6 - triphenylmethylaminopenicillanate in 115 ml. of dry acetone was treated with 0.950 g. (5.00 millimole) of p-toluenesulfonic acid monohydrate and allowed to stand with occasional agitation for 75 minutes at 25° C. It was then poured into 500 ml. of Skellysolve B (petroleum ether, B.P. 60–68° C.) and evaporated in vacuo at 33° in a rotary evaporator until all of the acetone and about one-third of the hydrocarbon solvent was removed. The remaining solvent was decanted from the product, which adhered to the wall of the flask. The product was washed in situ with 100 ml. of anhydrous ether which was then decanted. Addition of 15 ml. of ethyl acetate caused the product to crystallize. The mixture was diluted with 300 ml. of ether and the product, phenacyl 6-aminopenicillanate, p-toluenesulfonate salt, was collected by filtration and dried, yield 1.62 g., M.P. 138–140° dec. When the hydrocarbon solvent which had been decanted (above) was diluted to 1 liter with n-pentane, 0.70 g. of pure starting material was recovered. The yield was therefore 84.5%. A sample was prepared for analysis by dissolving it at room temperature in a minimum of ethyl acetate, filtering and precipitating with dry ether. Its ultraviolet spectrum in 95% ethanol had three maxima: $\epsilon_{220}=15,500$, $\epsilon_{241}=13,500$ and $\epsilon_{278}=1,300$. Its infrared spectrum in KBr exhibited an intense β-lactam at 1795 cm.$^{-1}$, ester carbonyl at 1760 cm.$^{-1}$, phenyl ketone at 1708 cm.$^{-1}$ and typical p-toluenesulfonate salt bands at 1015 and 1002 cm.$^{-1}$. Its NMR spectrum in CDCl$_3$ showed nine aromatic protons at 8.0 to 7.0δ, two protons of the β-lactam as an AB pattern centered at 5.55 and 5.03δ, the two protons of the phenacyl moiety at 5.48δ, the C$_3$ proton at 4.54δ, three protons of the aromatic methyl at 2.31δ, and the six protons of the gemdimethyl group at C$_2$ as a doublet at 1.70 and 1.66δ.

*Analysis.*—Calc'd for $C_{23}H_{26}N_2O_7S_2$ (percent): C, 54.31; H, 5.15; N, 5.51; S, 12.64. Found (percent): C, 54.25; H, 5.27; N, 5.33; S, 12.35.

$[\alpha]_D^{26} + 129°$ (c.=1, 95% $C_2H_5OH$).

EXAMPLE 2

Phenacyl 6-aminopenicillanate: A solution of 444 mg. (0.873 millimole) of phenacyl 6-aminopenicillanate, p-toluene-sulfonate salt, in 40 ml. of ethyl acetate was extracted with 15 ml. of 1% sodium bicarbonate solution, washed with four 10 ml. portions of water and evaporated to dryness on a rotary evaporator at 33°. The thoroughly dried gum, phenacyl 6-aminopeinicillanate, which was obtained was dissolved in 1 ml. of methylene chloride and pulled into a brittle foam by application of a high vacuum. The foam was broken up under n-pentane, filtered off and dried. The recovery amounted to 240 mg. (82.2%). Its infrared spectrum in CHCl$_3$ shows a weak NH band at 3380 cm.$^{-1}$, intense β-lactam at 1777 cm.$^{-1}$, ester carbonyl at 1760 cm.$^{-1}$, phenyl ketone at 1706 cm.$^{-1}$ and no trace of amide bands.

*Analysis.*—Calc'd for $C_{16}H_{18}N_2O_4S$ (percent): C, 57.46; H, 5.43. Found (percent): C, 58.28; H, 5.50.

EXAMPLE 3

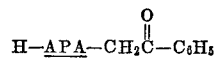

Phenacyl 6-aminopenicillanate via enzymatic cleavage of phenacyl 6-phenylacetamidopenicillanate: A solution of 1.00 g. (2.21 millimoles) of phenacyl 6-phenylacetamidopenicillanate in 10 ml. of dimethylsulfoxide was diluted with 90 ml. of 0.2 M pH 7.0 phosphate buffer and 100 ml. of *E. coli* penicillin G amidase solution. It was shaken at 37° for 4.0 hours at which time 0.68 g. of insoluble, crystalline starting material was recovered. The solution was extracted with one 300 ml. portion and three 100 ml. portions of ethyl acetate. The combined extracts were dried over sodium sulfate and evaporated to dryness at 33°. A yellow oil was obtained which consisted of approximately equal parts of dimethylsulfoxide and the expected amino ester, as shown by its infrared spectrum. It was dissolved in 75 ml. of ether and extracted with five 20 ml. portions of water. Evaporation of the solvent left 47 mg. of gum which was shown by its infrared spectrum in chloroform to be identical with the pure phenacyl 6-aminopenicillanate obtained from phenacyl 6-triphenylmethylaminopenicillanate by hydrolysis with p-toluenesulfonic acid monohydrate. The yield, corrected for recovered starting material, was 20%.

In order to establish unequivocally the structure of the product, it was reacylated at 25° in 2 ml. of chloroform with an equivalent of phenylacetyl chloride and an equivalent of triethylamine. The neutral product was recrystallized from ethyl acetate and Skellysolve B to yield 20 mg. (31%) of phenacyl 6-phenylacetamidopenicillanate, identified by its M.P. 130–134° and its infrared spectrum in KBr, which was identical with an authentic sample.

EXAMPLE 4

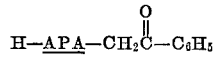

Phenacyl 6-phenylacetamidopenicillanate was enzymatically converted to phenacyl 6-aminopenicillanate (phenacyl 6-APA) as follows:

Substrate

Two ml. 10 mg./ml. phenacyl ester of penicillin G in acetone+3.0 ml. 0.2 M pH 7 phosphate buffer.

Reaction conditions

Fifteen ml. of enzyme were added to the 5 ml. substrates (1 mg./ml. substrate; 10% acetone). Samples were shaken at 32° and after ½, 1, 1½, 2 and 4 hours, aliquots were removed and the color of the Schiff base of the product was measured at 415 mμ after dilution with an equal volume of a solution of 5.83 g. p-dimethylaminobenzaldehyde and 5.83 mgm. hydroquinone in 350 ml. absolute ethanol diluted to 1000 ml. with pH 2.5 citric acid-Na$_2$HPO$_4$ buffer.

RESULTS

|  | Arthrobacter viscosus amidase | | E. coli amidase | |
| --- | --- | --- | --- | --- |
|  | μg./ml. phenacyl 6-APA | Percent conversion | μg./ml. phenacyl 6-APA | Percent conversion |
| ½ hour | 80 | 10.8 | 600 | 81.1 |
| 1 hour | 120 | *9.4 | 950 | *100 |
| 1½ hours | 180 | *12.7 | 1,050 | *100 |
| 2 hours | 290 | 39.2 | 700 | 94.5 |
| 4 hours | 360 | *26.7 | 1,000 | *100 |

*Theoretical yield of phenacyl 6-APA is 740 μg./ml. Values for E. coli amidase exceeded 100% and are corrected to 100% with proportional corrections for Arthrobacter viscosus amidase.

EXAMPLE 5

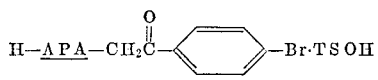

4'-bromophenacyl 6-aminopenicillanate, p-toluenesulfonate salt: A solution containing 219 mg. (0.333 millimole) of 4'-bromophenacyl 6-triphenylmethylaminopenicillanate and 63.4 mg. (0.333 millimole) of p-toluenesulfonic acid monohydrate in 4.0 ml. of acetone was allowed to stand at 25° for 75 minutes. It was diluted with 100 ml. of Skellysolve B and the acetone and about 30 ml. of the Skellysolve B were removed at 33° on a rotary evaporator. The solid product, 4'-bromophenacyl-6-aminopenicillanate, p-toluenesulfonate salt weighed 124 mg., (63.7%). It was reprecipitated from ethylene chloride by the addition of Skellysolve B. Its infrared spectrum in KBr showed a strong β-lactam at 1795 cm.$^{-1}$, ester carbonyl at 1760 cm.$^{-1}$, phenyl ketone at 1710 cm.$^{-1}$, and two intense p-toluenesuflonate salt bands at 1031 and 1007 cm.$^{-1}$.

Analysis.—Calc'd for $C_{23}H_{25}BrN_2O_4S_2$ (percent): C, 47.40; H, 4.52. Found (percent): C, 48.00; H, 4.85.

EXAMPLE 6

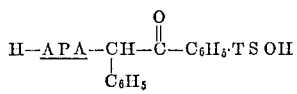

Desyl 6-aminopenicillanate, p-toluenesulfonate salt: A solution of 217 mg. (0.333 millimole) of desyl 6-triphenylmethylaminopenicillanate in 4.0 ml. of acetone was treated with 63.4 mg. (0.333 millimole) of p-toluenesulfonic acid monohydrate and allowed to stand at 25° for 75 minutes. It was diluted with 100 ml. of Skellysolve B and the acetone and about one-third of the Skellysolve B were removed at 33° on the rotary evaporator. The product, desyl 6-aminopenicillanate, p-toluenesulfonate salt, separated as a solid which adhered to the wall of the flask. The yield was 130 mg. (74%). Its infrared spectrum in CHCl$_3$ had an intense β-lactam at 1740 cm.$^{-1}$, ester carbonyl at 1747 cm.$^{-1}$, phenyl ketone at 1694 cm.$^{-1}$ and typical p-toluenesulfonate salt bands at 1031 and 1006 cm.$^{-1}$.

Analysis.—Calc'd for $C_{29}H_{30}N_2O_7S_2 \cdot \tfrac{1}{2}H_2O$ (percent): C, 58.86; H, 5.28; N, 4.74. Found (percent): C, 58.57; H, 5.39; N, 4.46.

Desyl 6-aminopenicillanate: A solution of 190 mg. (0.327 millimole) of desyl 6-aminopenicillanate, p-toluenesulfonate salt, in 20 ml. of ethyl acetate was extracted with 7 ml. of 1% sodium bicarbonate solution and thoroughly washed with water. Removal of the solvent and careful drying in vacuo left 90 mg. (66%) of desyl 6-aminopenicillanate as a brittle foam. Its infrared spectrum in CHCl$_3$ had an intense β-lactam at 1775 cm.$^{-1}$, ester carbonyl at 1747 cm.$^{-1}$, and phenyl ketone at 1694 cm.$^{-1}$. No amide bands were observed.

EXAMPLE 7

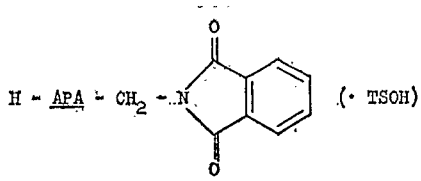

Phthalimidomethyl 6-aminopenicillanate, p-toluenesulfonate salt: Phthalimidomethyl 6-phenylacetamidopenicillanate (0.50 g.) was treated with E. coli amidase in the procedures set forth in Examples 3 and 4 above to give a solution of phthalimidomethyl 6-aminopenicillanate which was filtered and extracted first with one liter ethyl acetate and then with 500 ml. ethyl acetate. The combined solvent extracts were dried over sodium sulfate and filtered. After adding p-toluenesulfonic acid the ethyl acetate was removed by distillation in vacuo at 33° C. and 275 ml. anhydrous ether was added to the residue to precipitate solid phthalimidomethyl 6-aminopenicillanate, p-toluenesulfonate salt, which was collected and dried over P$_2$O$_5$ in vacuo, yield, 0.26 g. The product was dissolved in methylene chloride which was filtered. The addition of n-pentane reprecipitated the product which was dried over P$_2$O$_5$ in vacuo to yield 220 mg., M.P. 104–105° C.

EXAMPLE 8

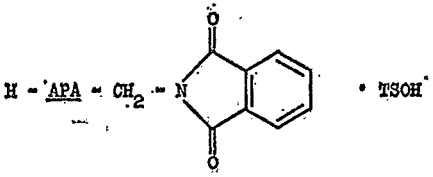

N-phthalimidomethyl 6-aminopenicillanate, p-toluenesulfonate salt: A clear solution of 183 mg. (0.296 millimole) of N-phthalimidomethyl 6-tritylaminopenicillanate and 63.4 mg. (0.333 millimole) of p-toluenesulfonic acid monohydrate in 4.0 ml. of dry acetone was allowed to stand at 25° for 1¼ hours. The solution was diluted with 100 ml. Skellysolve B and evaporated to a volume of about 50 ml. on the rotary evaporator. An additional 50 ml. of Skellysolve B was added and the product, N-phthalimidomethyl 6-aminopenicillanate, p-toluenesulfonate salt, which adhered to the wall of the flask was scraped loose and collected by filtration. The crude yield was 102 mg. (63%). It was reprecipitated from a few ml. of methylene chloride by dilution with n-pentane, 80 mg. (49%), M.P. 104–105°. Its infrared spectrum (KBr) was completely consistent with the expected structure, showing NH, β-lactam, imide, ester and typical p-toluenesulfonate salt bands.

Analysis.—Calc'd for $C_{24}H_{25}N_3O_8S_2 \cdot H_2O$ (percent): C, 50.96; H, 4.81. Found (percent): C, 51.03; H, 4.78.

EXAMPLE 9

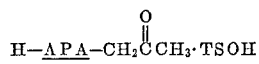

Acetonyl 6-aminopenicillanate p-toluenesulfonate: A solution containing 2.57 g. (5 millimoles) of acetonyl 6-triphenylmethylaminopenicillanate and 0.95 g. (5 millimoles) of p-toluenesulfonic acid monohydrate in 115 ml. of dry acetone was stirred for 75 minutes at 22°. The clear solution was added to 500 ml. of petroleum ether, B.P. 40–60°, and the solvents evaporated under reduced pressure to a volume of 80 ml. The solvent was decanted and the solid remaining was crystallized by the addition of 15 ml. of ethyl acetate, 300 ml. of ether were added and the solid acetonyl 6-aminopenicillanate p-toluenesulfonate was collected and dried. The yield was 1.7 g. of M.P. 100–105° dec. It was purified by stirring for 15 minutes with 100 ml. ethyl acetate; the colored impurities dissolved and the salt was collected by filtration and dried in vacuo. The product (1.13 g., 52%) had an M.P. of 108–110° dec. Infrared absorption maxima were observed at 1795 (β-lactam carbonyl), 1760 (ester carbonyl), 1740 (aliphatic ketone) and at 1012 and 1036 cm.$^{-1}$ (p-toluenesulfonate). The NMR spectrum was consistent with the structural assignment.

EXAMPLE 10

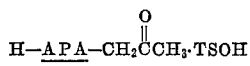

Acetonyl 6-aminopenicillanate p-toluenesulfonate: A solution containing 719.8 mg. of acetonyl 6-phenylacetamidopenicillanate in 14.4 ml. of acetone and 21.6 ml. of pH 7 phosphate buffer was shaken at 37° for 2.5 hours with 108 ml. of *E. coli* amidase. The solution was extracted twice with 170 ml. ethyl acetate. The dried extracts were treated with 350.6 mg. p-toluenesulfonic acid monohydrate and the clear solution was evaporated to a volume of 30 ml. The crystalline acetonyl 6-aminopenicillanate p-toluenesulfonate which separated was collected by filtration, washed with petroleum ether (B.P. 60–80°) and dried in vacuo. This gave 270 mg., 33%, of acetonyl 6-aminopenicillanate p-toluenesulfonate which had M.P. and infrared spectrum identical with the sample prepared from acetonyl 6-triphenylmethylaminopenicillanate.

EXAMPLE 11

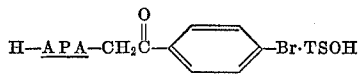

p-Bromophenacyl 6-aminopenicillanate mono p-toluenesulfonic acid salt: Crystalline 6-aminopenicillanic acid triethylammonium salt (7.92 g.; 0.025 mole) was slurried in 100 ml. methylene chloride and with stirring 6.95 g. (0.025 mole) p-bromophenacyl bromide was added dropwise in 100 ml. methylene chloride over a 30-minute period. Stirring was continued for two hours at room temperature (22° C.) and then the turbid solution washed with water (3× 50 ml.), 2% NaHCO$_3$ (3× 50 ml.) and water (3× 50 ml.). The methylene chloride solution was then clarified by filtration through anhydrous sodium sulfate and to it there was added, dropwise, a solution of p-toluenesulfonic acid (2% in ethyl acetate) until the pH was 2. The solvents were then removed at 20° C. under reduced pressure and the oily residue redissolved in 200 ml. ethyl acetate and again the solvent was removed under reduced presure. The resulting oil was then triturated with 300 ml. dry ether and the ether insoluble residue triturated with 50 ml. ethyl acetate. The resulting gum was dissolved in 100 ml. acetone and diluted to the cloud point with dry ether. Upon scratching crystallization began and after 30 minutes there was obtained 1.7 g. p-bromophenacyl 6-aminopenicillanate mono p-toluenesulfonic acid salt, ether-washed and vacuum-dried over P$_2$O$_5$. A second crop (700 mg.) and a third crop (400 mg.) were obtained and were identical by infrared with the first crop. The total yield was 2.8 g. or 19% of theory. The melting point was 155–156° C. and the IR and NMR analyses were entirely consistent with the proposed structure.

*Analysis.*—Calc'd for C$_{16}$H$_{17}$BrN$_2$O$_4$S·C$_7$H$_8$SO$_3$ (percent): C, 47.18; H, 4.31; N, 4.80. Found (percent): C, 47.79; H, 4.31; N, 4.65.

The same product was obtained by using dimethylformamide (DMF) as the solvent and two molar equivalents of p-bromophenacyl bromide.

EXAMPLE 12

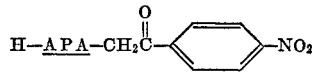

Preparation of triethylammonium 6-aminopenicillanate (crystalline): Forty-three and two-tenths grams (0.2 mole) of 6-APA was stirred in 400 ml. of methylene chloride and to it was added, all at once, 56 ml. of triethylamine (TEA). Stirring was continued for 30 minutes and then the turbid solution filtered through "Dicalite" filter aid (diatomaceous earth) with suction. The filtrate was evaporated in vacuo to a small volume taking care *not* to remove all the excess TEA. At this point about 300 ml. ethyl acetate was added and with vigorous swirling, solution was obtained. Almost immediately crystallization began and after 15 minutes the product was collected by filtration, washed with ethyl acetate and air dried. Yield: 45 g. crystalline triethylammonium 6-aminopenicillanate (6-APA·TEA).

p-Nitrophenacyl 6-aminopenicillanate p-toluenesulfonic acid salt: To a stirred and cooled (2° C.) solution of 9.7 g. (0.03 mole) of crystalline 6-APA·TEA in 50 ml. of dimethylformamide (DMF) was added a solution of 14.7 g. (0.061 mole) p-nitrophenacyl bromide in 50 ml. DMF dropwise over a half-hour period. The ice bath was removed and stirring continued for two hours. Working up the experiment the same way as given above in Example 11 gave 7.5 g. p-nitrophenacyl 6-aminopenicillanate p-toluenesulfonic acid salt which was recrystallized from 200 ml. boiling acetone which was diluted to the cloud point with dry ether, scratched and cooled. Yield: 5 g., dec. pt. 121° C.

EXAMPLE 13

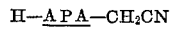

Cyanomethyl 6 - aminopenicillanate: Potassium 6-N-tritylaminopenicillanate (7.45 g.; 0.015 mole) and chloroacetonitrile (2.03 g.; 0.0155 mole) were combined in 140 ml. dimethylacetamide and stirred at room temperature for three hours. The solution was poured into 1000 mls. 5% aqueous sodium chloride to precipitate the product, cyanomethyl 6-N-tritylaminopenicillanate, as a gummy solid which was collected and dissolved in ethyl acetate and then dried by vacuum distillation of the ethyl acetate. The residual product was slurried in Skellysolve B to form an amorphous white solid (3.45 g.), M.P. 78–81° C. The use of this material in the procedure of Examples 1, 6 and 9 yields cyanomethyl 6 - aminopenicillanate, which is isolated as its solid salt with p-toluenesulfonic acid.

EXAMPLE 14

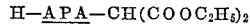

Dicarbethoxymethyl 6 - aminopenicillanate: Potassium penicillin G (7.64 g.; 0.0216 mole) and diethyl bromomalonate (5.26 g.; 0.022 mole) were combined in 220 ml. dimethylacetamide and the mixture was stirred at 25° C. for 95 minutes and then poured into 1400 ml. aqueous 5% sodium chloride. The product, dicarbethoxymethyl 6-phenylacetamidopenicillanate was extracted into ether and the ethereal extract was washed with water, dried over MgSO$_4$ and the solvent was removed by distillation in vacuo to leave the product as an oil which weighed 4.2 g. after trituration in Skellysolve B and removal of the solvent in vacuo. The use of this product in the enzymatic deacylation procedures of Examples 3 and 4 produces dicarbethoxymethyl 6 - aminopenicillanate.

EXAMPLE 15

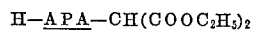

Dicarbethoxymethyl 6 - aminopenicillanate: Potassium 6 - N - tritylaminopenicillanate (7.45 g.; 0.015 mole) and diethyl bromomalonate (3.66 g.; 0.0153 mole) were mixed in 200 ml. dimethylacetamide and stirred for one hour at room temperature. This mixture was then poured into 1300 ml. 5% aqueous sodium chloride to precipitate the product, dicarbethoxymethyl 6-N-tritylaminopenicillanate, as a gum which was collected and dried by flashing with ethyl acetate. The product remained then as a white crystalline solid of which the acetone insoluble portion weighed 5.7 g., M.P. 167–169° C. The use of this product in the detritylation procedure of Examples 1, 6 and 9 produces dicarbethoxymethyl 6 - aminopenicillanate, which is isolated as its solid salt with p-toluenesulfonic acid.

EXAMPLE 16

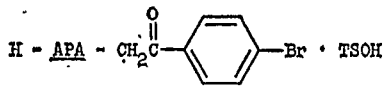

p-Bromophenacyl 6 - aminopenicillanate p - toluenesulfonic acid salt: To a stirred solution of 95.1 g. (0.3 mole) triethylammonium 6 - aminopenicillanate in 500 ml. methylene chloride was added, all at once, a solution of 83.4 g. (0.3 mole) p-bromophenacyl bromide in 500 ml. methylene chloride. After three hours the solution was extracted with three 500 ml. portions of water, three 500 ml. portions of 5% $NaHCO_3$ and three 500 ml. portions of water. The $CH_2Cl_2$ solution was clarified by filtration through anhydrous sodium sulfate and then treated with a saturated solution of p-toluenesulfonic acid hydrate in ethyl acetate until pH 2 (moist pH paper) was obtained. The resulting solution was concentrated under reduced pressure to about one-third volume and the resulting crystalline material collected by filtration and washed with three 200 ml. portions of ethyl acetate. The yield of vacuum-dried p-bromophenacyl 6 - aminopenicillanate p-toluenesulfonic acid salt was 71 g. (39% of theoretical yield), M.P. 160° C.

Analysis.—Calc'd for $C_{16}H_{17}BrN_2O_4S \cdot C_7H_8SO_3$ (percent). C, 47.18; H, 4.31; N, 4.81. Found (percent): C, 47.41; H, 4.49; N, 4.62.

ACYLATION OF ACTIVATED ESTERS OF 6–APA

The following procedures will serve to illustrate the conversion of the activated esters of 6-aminopenicillanic acid by acylation to activated esters of penicillins.

Procedure No. 1

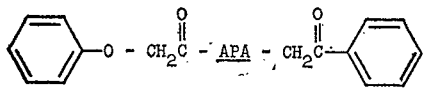

Phenacyl 6 - (α - phenoxyacetamido)penicillanate: A solution of 236 mg. (0.465 millimole) phenacyl 6-aminopenicillanate, p-toluenesulfonate salt, in 10 ml. dry acetone was cooled to —5° and 0.072 ml. (0.46 millimole) phenoxyacetyl chloride was added. An ice-cold solution of 0.131 ml. (0.93 millimole) triethylamine in 4 ml. of acetone was added during 30 seconds. A precipitate was observed within two minutes. The mixture was stirred for 1¾ hours at —5°. The solvent was removed at 33° and the residue dissolved in 50 ml. ether and 20 ml. water. The ether solution was successively extracted with 10 ml. 1% sodium bicarbonate, 10 ml. 0.5 N sulfuric acid, and three 10 ml. portions of water. The solvent was removed at 33° and the remaining gum of phenacyl 6-(α-phenoxyacetamido)penicillanate was dried thoroughly in vacuo, yield 160 mg. The sample was dissolved in 10 ml. methylene chloride, filtered and the solvent removed in vacuo to leave a fragile foam which was broken up under n-pentane and collected by filtration. The yield of purified phenacyl 6-(α-phenoxyacetamido)-penicillanate was 136 mg., 64%. Its infrared spectrum in chloroform had a sharp NH band at 3400 cm.$^{-1}$, β-lactam at 1795 cm.$^{-1}$, ester carbonyl at 1760 cm.$^{-1}$, super-imposed phenyl ketone and amide at 1705 cm.$^{-1}$, and amide II band at 1515 cm.$^{-1}$. Its NMR spectrum in CDCl$_3$ demonstrated the presence of ten aromatic protons and the NH at 8.0 to 6.8δ, four protons at 5.8 to 5.0δ which include the β-lactam protons and the two protons adjacent to the carbonyl of the phenacyl moiety, the single proton on $C_3$ at 4.60δ, the two protons next to the carbonyl of the phenoxyacetyl moiety at 4.50δ, and the six protons of the gem-dimethyl at 1.68δ. The infrared and NMR spectra of this product were identical with the spectra of the same material prepared from potassium penicillin V and 2-chloroacetophenone according to the procedure of McDuffie and Cooper, U.S. 2,578,570.

Analysis.—Calc'd for $C_{24}H_{25}N_2O_6S$ (percent): C, 61.52; H, 5.16. Found (percent): C, 62.43; H, 5.74.

Procedure No. 2

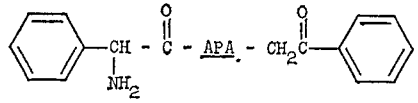

Phenacyl 6-(α-amino - α - phenylacetamido)penicillanate: A solution of 509 mg. (1.00 millimole) of phenacyl 6-amino-penicillanate, p-toluenesulfonate salt, in 20 ml. dry acetone was cooled to —5° and 206 mg. (1.00 millimole) of D(—) α-phenylglycyl chloride hydrochloride was suspended in it. A solution of 304 mg. (3.00 millimole) triethylamine in 14 ml. acetone was added during 2 minutes and the mixture was stirred at —5° for ½ hour. It was then allowed to warm to 20° during 25 minutes. The solvent was removed at 33° and the residue was dissolved in 20 ml. water and 30 ml. ethyl acetate. A trace of phenylglycine crystallized and was filtered off. The ethyl acetate solution was washed with three 15 ml. portions of water, evaporated to dryness under reduced pressure and pulled into a brittle foam of phenacyl 6-(α-amino - α - phenylacetamido)penicillanate under high vacuum. The foam was broken up under n-pentane, collected by filtration and dried to give 405 mg. (86.7%). It was purified for analysis by solution in 40 ml. methylene chloride, treatment with 0.1 g. of decolorizing carbon, filtering and re-isolation as a brittle, non-hygroscopic foam. Its ultraviolet spectrum in 95% ethanol exhibited two maxima: $\epsilon_{240}=15,750$, $\epsilon_{275}=1,790$. Its infrared spectrum in CHCl$_3$ had NH bands at 3370 and 3310 cm.$^{-1}$, β-lactam at 1785 cm.$^{-1}$, ester carbonyl at 1755 cm.$^{-1}$, phenyl ketone at 1705 cm.$^{-1}$, amide at 1690 cm.$^{-1}$ and an amide II band at 1490 cm.$^{-1}$. The NMR spectrum of this compound in CDCl$_3$ revealed ten aromatic protons at 8.0 to 7.2δ, two β-lactam protons super-imposed on the two protons next to the carbonyl of the phenacyl moiety at 5.5δ, the proton at $C_3$ and the proton α to the amine function were seen at 4.5δ, and the six gem-dimethyl protons appeared as a doublet at 1.72 and 1.70δ.

Analysis.—Calc'd for $C_{24}H_{25}N_3O_5S$: (percent): C, 61.65; H, 5.39. Found (percent): C, 62.22; H, 5.91.

Procedure No. 3

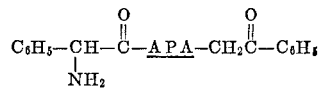

Phenacyl 6-D(—) - α - aminophenylacetamido)penicillanate: (Via N,N'-dicyclohexylcarbodiimide). A solution of 167 mg. (0.50 millimole) phenacyl 6-aminopenicillanate and 103 mg. (0.50 millimole) N,N'-dicyclohexylcarbodiimide in 3.0 ml. methylene chloride was added to a suspension of 94 mg. (0.50 millimole) D(—) phenylglycine hydrochloride in 1.0 ml. N,N-dimethylformamide. The mixture was shaken occasionally at 25° for 50 minutes. It was then filtered over diatomaceous earth ("Supercel") and diluted with 75 ml. dry ether. The resulting precipitate, 218 mg., was distributed between 8 ml. 0.2 N hydrochloric acid and 40 ml. ethyl acetate. The aqueous layer was washed with ether, neutralized with sodium bicarbonate and extracted with ethyl acetate. Removal of the solvent from the ethyl acetate extract and thorough drying of the residue left 39 mg. of phenacyl 6 - D(—)-α-aminophenylacetamido)penicillanate as a gummy foam. Its infrared spectrum in CHCl$_3$ which had sharp, intense bands at 1785 cm.$^{-1}$ for β-lactam, 1755 cm.$^{-1}$ (ester carbonyl), 1705 cm.$^{-1}$ (phenyl ketone), 1685 cm.$^{-1}$ (amide) and 1505 cm.$^{-1}$ (amide II), showed

Procedure No. 4

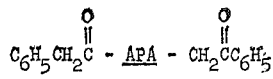

Phenacyl 6 - (2 - phenylacetamido)penicillanate: A solution of 254 mg. (0.500 millimole) of phenacyl 6-aminopenicillanate, p-toluenesulfonate salt, in 10 ml. dry acetone was cooled to —5°. With vigorous stirring 77 mg. (0.50 millimole) phenylacetyl chloride was added followed immediately by 101 mg. (1.00 millimole) triethylamine in 4 ml. ice-cold acetone. A precipitate formed immediately. The solution was stirred for 30 minutes at —5°. The solvent was removed in vacuo at 33° and the residue was dissolved in 50 ml. ether and 20 ml. water. The water was separated and discarded and the organic phase was extracted successively with 10 ml. of 0.5 N sulfuric acid, 20 ml. water, 20 ml. 1% sodium bicarbonate and three 10 ml. portions of water. The solvent was then removed at 33°, the crystalline residue thoroughly dried and recrystallized from hot ethyl acetate and Skellysolve B. The yield was 106 mg. (46.9%) of phenacyl 6 - (2-phenylacetamido)penicillanate as stout rods, M.P. 130–134°. Recrystallization from the same solvent pair raised the melting point to 136–138°. The infrared and NMR spectra were found to be identical with those of an authentic sample of the title compound prepared by the procedure of McDuffie and Cooper, U.S. 2,578,570.

*Analysis.*—Calc'd for $C_{24}H_{24}N_2O_5S$ (percent): C, 63.70; H, 5.35. Found (percent): C, 64.07; H, 5.42.

Procedure No. 5

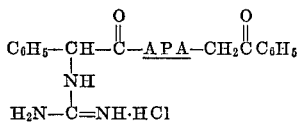

Phenacyl 6 - D(—) - α - guanidinophenylacetamido) penicillanate hydrochloride: A solution of 682 mg. (2.04 millimole) phenacyl 6-aminopenicillanate and 420 mg. (2.04 millimole) N,N'-dicyclohexylcarbodiimide in 12.0 ml. methylene chloride was added to a solution of 469 mg. (2.04 millimole) D(—) - α - guanidinophenylacetic acid hydrochloride in 4.0 ml. N,N-dimethylformamide and the resulting clear solution was agitated at 25° for 30 minutes. Within two minutes a precipitate of N,N'-dicyclohexylurea began to appear. At the end of the reaction, 262 mg. (57.3%) of the latter by-product was filtered off. The filtrate was diluted to 400 ml. with dry ether and the crystalline product was collected by filtration and dried, yield 978 mg. (88.0%), M.P. 134–140° dec. It was recrystallized twice by solution in damp acetone, dilution with ethyl acetate and removal of the acetone and water on the rotary evaporator at 35°, re-recovery 740 mg. phenacyl 6 - D(—)-α-guanidinophenylacetamido)penicillanate hydrochloride, M.P. 145–149° dec. Final purification was accomplished by shaking the product with a mixture of 15 ml. 0.2 N hydrochloric acid, 30 ml. ethyl acetate and 30 ml. ether. This process yielded 589 mg. (53.0%) of phenacyl 6 - D(—) - α-guanidinophenylacetamido)penicillanate hydrochloride as white crystals, M.P. 146–147° dec. Its IR spectrum (KBr) showed a broad NH at 3300 to 3120 cm.$^{-1}$, β-lactam 1785 cm.$^{-1}$, ester carbonyl 1755 cm.$^{-1}$, phenyl ketone 1695 cm.$^{-1}$, amide and imine 1665 to 1650 cm.$^{-1}$ and amide II 1540 to 1515 cm.$^{-1}$.

Procedure No. 6

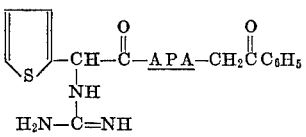

D(—) - α - (2 - thienyl) - α - guanidinoacetic acid and hydrochloride: To a stirred solution of 200 g. (approx. 1.2 mole) of O-methylpseudourea sulfate (Eastman Organic Chemicals) in one liter of methanol was added 129.6 g. (2.4 moles) sodium methylate at 5° C. The temperature rose to 38° and then subsided. When the temperature reached 25° the ice-bath was removed and the slurry was filtered through a "Dicalite" filter aid with suction. The cake was washed with three 100 ml. portions of methanol and combined with the filtrate. The methanol solution was cooled and stirred in an ice-bath while 62.9 g. (0.4 mole) of D(—)-α-(2-thienyl)glycine was added. After solution had been obtained the mixture was filtered by gravity, seeded with the product, D(—)-α-(-2thienyl)-α-guanidinoacetic acid, and allowed to stand 96 hours at 5–10° C. The crystalline D(—) - α - (2-thienyl)-α-guanidinoacetic acid was collected by filtration, washed with methanol and air-dried. The yield was 40 g. (46%) (decomp. at 230° C.).

The 40 g. of D(—)-α-(2 - thienyl)-α-guanidinoacetic acid was dissolved in 200 ml. water and concentrated hydrochloric acid (enough to cause solution). The water and hydrochloric acid were then removed under reduced pressure at 60° C. Two liters of p-dioxane was then added to the residual oil and with rubbing and scratching there was obtained 42 g. of crystalline; vacuum-dried (over $P_2O_5$) D(—)-α-(2-thienyl)-α-guanidinoacetic acid hydrochloride decomposing at 140°. IR and NMR spectra were consistent with structure and contained no impurities of the L(—) isomer.

Phenacyl 6-[α-guanidino - α - (2 - thienyl)acetamido] penicillanate hydrochloride: To 2.543 g. (0.005 mole) of phenacyl 6-aminopenicillanate p-toluenesulfonic acid salt was added 200 ml. ethyl acetate and 100 ml. 1% $NaHCO_3$ and the mixture shaken until all had dissolved. The organic layer was washed with three 50 ml. portions of water, filtered through anhydrous sodium sulfate and the ethyl acetate removed under reduced pressure. The resulting oil was dissolved in 100 ml. ethyl acetate and again the ethyl acetate was removed under reduced pressure. This was repeated one more time to assure removal of water. To this residue (gum) was added 18 ml. methylene chloride 1.030 g. (0.005 mole) N,N'-dicyclohexylcarbodiimide and finally 1.178 g. (0.005 mole) α-guanidino-α-(2-thienyl) acetic acid hydrochloride in 6 ml. of DMF (dimethylformamide). An exothermic reaction proceeded and within one minute crystalline dicyclohexylurea crystallized out. After stirring 45 minutes the urea was filtered off through "Dicalite" filter aid with suction and two 25 ml. $CH_2Cl_2$ washes were combined with the filtrate. Two hundred ml. of anhydrous ether was added and a gummy precipitate was deposited. The solvents were decanted off and 100 ml. ethyl acetate was added followed by 50 ml. 0.3 N HCl. The ethyl acetate layer was separated after shaking and washed once with 50 ml. water. On addition of 200 ml. Skellysolve B (petroleum ether, B.P. 60–68° C.) there was deposited a gum which was triturated with dry ether and finally ethyl acetate to give 500 mg. of product as an amorphous solid.

The reaction was repeated using the same quantities and procedure as before but this time the p-toluenesulfonic acid salt was suspended in the $CH_2Cl_2$ and 0.7 ml. of triethylamine was added dropwise to liberate the free base of the ester in situ. After the reaction was over and the dicyclohexylurea filtered off, the solvents were removed under high vacuum (0.10 mm. Hg) at 20° leaving an oil which was triturated with 150 ml. dry ether and the ether discarded. The gum was then treated with 100 ml. ethyl acetate and 50 ml. 0.3 N HCl. Shaking resulted in a two-phase solution and the organic layer was washed with three 25 ml. portions of water. The organic layer was then filtered through $Na_2SO_4$ and evaporated under reduced pressure to an oil which was further dried by two more azeotropic distillations (100 ml.) with ethyl acetate. Dry ether trituration resulted in a solid ( 2.3 g.) which was dried under high vacuum over $P_2O_5$. IR and NMR analyses were consistent with the structure.

Procedure No. 7

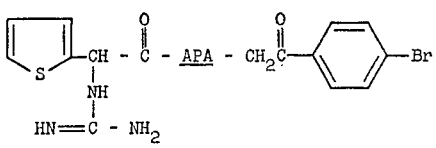

p-Bromophenacyl 6 - [α - guanidino-α-(2-thienyl)acetamido]penicillanate hydrochloride: A mixture of 11.70 g. (0.020 mole) of p-bromophenacyl 6-aminopenicillanate p-toluene sulfonic acid salt, 200 ml. ethyl acetate and 300 ml. 5% $NaHCO_3$ were shaken until all had dissolved. The organic layer was washed with one 200 ml. portion of 5% $NaHCO_3$, three 100 ml. portions of water and two 100 ml. portions of saturated sodium chloride (aqueous). The ethyl acetate layer was then filtered through sodium sulfate and evaporated to an oil under reduced pressure. Two hundred ml. $CH_2Cl_2$ was added and removed under reduced pressure to remove any remaining water. To this oil was added 100 ml. $CH_2Cl_2$ followed by 4.12 g. (0.020 mole) N,N'-dicyclohexylcarbodiimide and finally 4.71 g. (0.020 mole) D(—)-α-guanidino-α-(2-thienyl)acetic acid hydrochloride in 50 ml. DMF with stirring. Within a few minutes crystalline N,N'-dicyclohexylurea precipitated and after 30 minutes was filtered off. The filtrate was diluted with 800 ml. dry ether and cooled in an ice bath. The gummy precipitate which separated out was triturated with dry ether and ethyl acetate to give a semi-solid which was dissolved in 300 ml. acetone, 300 ml. water and 300 ml. ethyl acetate. To this solution was added 500 ml. more of ethyl acetate and the mixture shaken. The bottom layer was separated and placed on the flash evaporator and under reduced pressure at 20° C. the acetone and residual ethyl acetate were removed causing the p-bromophenacyl 6-[α - guanidino - α - (2-thienyl)acetamido]penicillanate hydrochloride to crystallize. The crystals were collected by filtration washed with water and air-dried. The yield was 3.2 g. This material was slurried in 100 ml. acetone for 30 minutes filtered, washed with acetone and vacuum dried over $P_2O_5$ for 12 hours to yield 2.65 g. (decomp. at 155°). IR and NMR showed the compound to be very pure.

*Analysis.*—Calc'd for $C_{23}H_{25}ClBrN_5O_5S_2$ (percent): C, 43.74; H, 3.99; N, 11.10. Found (percent): C, 42.79; H, 4.51; N, 10.45. Corrected for 6.00% $H_2O$: C, 45.1; H, 4.27; N, 11.07.

CLEAVAGE OF ACTIVATED ESTERS OF PENICILLINS

The following procedures will serve to illustrate the conversion of activated esters of penicillins to penicillins.

Procedure No. 8

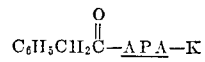

Potassium 6-phenylacetamidopenicillanate: A solution of 2.27 g. phenacyl 6-phenylacetamidopenicillanate and 1.00 ml. aniline in 125 ml. dry tetrahydrofuran (THF) was stirred with a stream of nitrogen and photolyzed with a 100 watt Hanovia mercury arc lamp, type SOL, for 2 hours at an exterior temperature of 7°. The solvent was removed in a rotary evaporator at 33° and the residue was dissolved in 150 ml. ether. The solution was extracted with three 25 ml. portions of 3% sodium bicarbonate and dissolved ether was evaporated in vacuo. The basic solution was filtered over "Supercel," acidified with 3 N hydrochloric acid and the resulting heavy turbidity was extracted into two 100 ml. portions of ether. The ethereal solution was washed thoroughly with ice water, dried over sodium sulfate and the potassium 6-phenylacetamidopenicillanate precipitated by the addition of two equivalents of potassium 2-ethylhexanoate as a 50% solution in n-butanol. The crude crystalline product, 1.88 g. (100%), was found to have penicillin G activity of 960 units per milligram, corresponding to 60.0% pure penicillin G. It was recrystallized by dissolving in wet n-butanol and removing the water as an azeotrope under vacuum at 35°. The purified product, 1.08 g. (58.2%), assayed at 1500 units per milligram or 94% pure penicillin G potassium salt. Its infrared spectrum was identical with authentic material.

Procedure No. 9

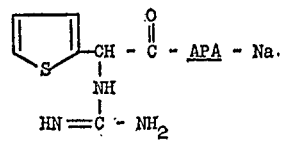

Sodium 6-[α-(2-thienyl)-α-guanidinoacetamido]penicillanate: To a stirred solution of 2.06 g. (0.003 mole) of phenacyl 6 - [α-(2-thienyl)-α-guanidinoacetamido]penicillanate in 6 ml. dimethylformamide (DMF) was added 0.42 ml. (0.003 mole) triethylamine (TEA) followed by 0.793 g. (0.003 mole) sodium thiophenoxide. The resulting solution was stirred 10 minutes and then diluted with 200 ml. ethyl acetate. The precipitate formed was collected by filtration, washed with ethyl acetate and finally washed with Skellysolve B. After drying 12 hours over $P_2O_5$ in vacuo there was obtained 1.7 g. of the product, sodium 6-[α-(2-thienyl)-α-guanidinoacetamido] penicillanate, which slowly decomposed above 100° C. The IR and NMR analyses showed the product to be impure.

*Analysis.*—Calc'd (percent): C, 42.96; H, 4.33; N, 15.29. Found (percent): C, 44.82; H, 4.77; N, 14.90. Karl Fisher $H_2O=5.39\%$.

This product in vitro exhibited Minimum Inhibitory Concentrations of 0.5–1.0 mcg./ml. vs. *Staphylococcus aureus* Smith and of 3.1–6.2 mcg./ml. vs. the benzylpenicillin-resistant *Staphyloccus aureus* BX–1633–2 and of 12.5 mcg./ml. vs. *Shigella sonnei* and in mice vs. *Staphylococcus aureus* BX–1633–2 exhibited $CD_{50}$'s of about 16 mgm./kg. upon intramuscular injection and about 330 mgm./kg. upon oral administration.

The same product is obtained by the use in the procedure described above, of the p-bromophenacyl ester described above in Procedure No. 7.

Procedure No. 10

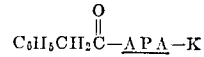

Sodium 6-phenylacetamidopenicillanate: A solution containing 452 mg. (1.00 millimole) of phenacyl 6-phenylacetamidopenicillanate and 264 mg. (2.00 millimole) of sodium thiophenoxide in 1.81 ml. of dimethylformamide was allowed to stand at 25° for 15 minutes. Dilution with 180 ml. dry acetone precipitated 274 mg. crystalline sodium penicillin G, M.P. 225-227° dec. Its infrared spectrum in KBr was identical with that of an authentic specimen.

(Reference: J. C. Sheehan and G. D. Daves, Jr., J. Org. Chem. 29, 2006 (1964)).

Procedure No. 11

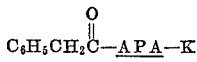

Potassium 6-phenylacetamidopenicillanate: A solution containing 2.27 g. (4.29 millimole) of desyl 6-phenylacetamidopenicillanate and 1.07 g. (11.5 millimole) of aniline in 125 ml. dioxane was placed between the walls of a fused quartz immersion well equipped with a dip-tube through which a slow stream of nitrogen was passed to effect agitation. A 100 watt Hanovia mercury arc, type SOL, was placed in the center well and the apparatus was immersed in a circulating bath of water at 8°. The solution was photolyzed for 2 hours. The solvent was removed at 35°, the residue dissolved in 200 ml. ether, and extracted with three 25 ml. portions of 9% sodium bicarbonate. Dissolved ether was removed from the combined bicarbonate washes which were then filtered over "Supercel" to remove a trace of gummy material. Acidification of the filtrate with 6 N sulfuric acid produced a heavy turbidity which was quickly extracted into 100 ml. ether. The ether solution was washed with 50 ml. water and two 30 ml. portions of saturated sodium chloride solution, dried over sodium sulfate and filtered. Addition of 5.0 ml. 50% (w./v.) potassium 2-ethylhexanoate in ether caused immediate precipitation of crystalline potassium penicillin G. The yield was 0.98 g. (61%) of potassium 6-phenylacetamidopenicillanate which was shown by its infrared spectrum (KBr) to be identical with authentic penicillin G potassium salt. Bioassay of the product showed it to have an activity of 1400 units per milligram, indicating that the sample was 88% pure.

Procedure No. 12

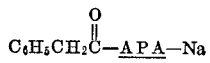

Sodium 6 - phenylacetamidopenicillanate: A solution containing 452 mg. (1 millimole) of phenacyl 6-phenylacetamidopenicillanate and 264 mg. (2 millimole) sodium thiophenoxide in 2 ml. dry dimethylformamide (DMF) was stored at room temperature (22°) for 15 minutes. To the stirred solution was added 40 ml. dry acetone. After 10 minutes a crystalline solid separated. This was collected by filtration, washed with dry ether and dried in vacuo over $P_2O_5$. The yield of sodium 6-phenylacetamidopenicillanate was 310 mg., 79%. The identity of the product was established by comparison of the infrared spectrum with that of authentic materal; and also by thin-layer co-chromatography with authentic benzylpenicillin on silica-gel using an acetonebenzeneacetic acid (12:12:1) solvent system.

Procedure No. 13

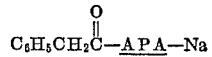

Sodium 6 - phenylacetamidopenicillanate: A solution containing 296 mg. (0.6 millimole) phthalimidomethyl 6-phenylacetamidopenicillanate and 79 mg. (0.6 millimole) sodium thiophenoxide in 1.1 ml. dry DMF was stored at room temperature (22°) for four hours. To the stirred solution was added 40 ml. dry acetone. The stirred and chilled (5°) solution deposited sodium 6-phenylacetamidopenicillanate as a crystalline solid. This was collected by filtration, washed with ether and dried in vacuo over $P_2O_5$. The yield of the sodium salt of benzylpenicillin was 61 mg., 24%. The comparisons described above showed the product to be identical with authentic benzylpenicillin.

Procedure No. 14

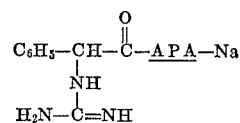

Sodium 6 - [D(—)-α-guanidinophenylacetamido]penicillanate: To a solution of 261 mg. (0.48 millimole) of phenacyl 6-[D(—)-α-guanidinophenylacetamido]penicillanate hydrochloride and 48 mg. (0.48 millimole) triethylamine in 1.5 ml. dry DMF was added 126 mg. (0.96 millimole) sodium thiophenoxide. After 15 minutes at room temperature (22°), the mixture was treated with 30 ml. ethyl acetate to afford sodium 6-[D(—)-α-guanidinophenylacetamido]penicillanate as a cream-colored solid. This was collected by filtration, washed with ether and dried in vacuo over $P_2O_5$. Infrared and NMR spectra showed that the phenacyl ester had been cleaved and that the product was contaminated with DMF. M.P. 192–194° dec.

Procedure No. 15

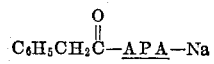

Sodium 6 - phenylacetamidopenicillanate: A solution containing 348 mg. (0.89 millimole) of acetonyl 6-phenylacetamidopenicillanate and 275 mg. of sodium thiophenoxide in 1.5 ml. DMF was stored at 22° for 15 minutes. Forty ml. of acetone was added and the solution was stirred at 5° for 15 minutes. A crystalline solid was collected by filtration, washed with acetone and dried in vacuo. The yield of sodium 6-phenylacetamidopenicillanate was 266 mg., 83%. The NMR spectrum of the product was identical with that of authentic potassium benzylpenicillin. Thin-layer chromatography on silica gel in an acetone-benzene-acetic acid (12:12:1) solvent system showed only one zone corresponding exactly with that given by authentic potassium benzylpenicillin.

With a reaction time of 50 minutes, a yield of 81% was obtained.

Procedure No. 16

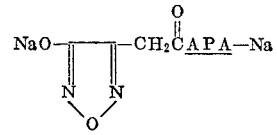

Disodium 6-(3-hydroxy-4-furazanacetamido)penicillanate and p-bromophenacyl ester: To a stirred solution of 5.85 g. (0.01 mole) of p-bromophenacyl 6-aminopenicillanate p-toluenesulfonic acid salt in 25 ml. of dimethylformamide (DMF) was added 1.4 ml. (0.01 mole) of triethylamine (TEA) followed by 1.44 g. (0.01 mole) 3-hydroxy-4-furazanacetic acid and finally 2.06 g. (0.01 mole) N,N'-dicyclohexylcarbodiimide in 50 ml. $CH_2Cl_2$. The stirred solution immediately began to precipitate N,N'-dicyclohexylurea and after 15 minutes the urea was filtered off and the filtrate diluted to 300 ml. with ethyl acetate. This solution was washed with three 200 ml. portions of water and two 100 ml. portions of saturated NaCl solution. The ethyl acetate solution was dried 45 minutes over anhydrous $Na_2SO_4$ and filtered. The solution was evaporated under reduced pressure to an oil. Two hundred ml. of ethyl acetate was added and the solution filtered and stripped again. The resulting gum was redissolved in 100 ml. ethyl acetate and 6.9 ml. (approx. 0.02 mole) 60% NaEH (sodium 2-ethylhexanoate in n-butanol) was added with stirring. Removal of solvents under reduced pressure and trituration with dry ether gave 5 g. of a solid which by IR analysis indicated the desired structure:

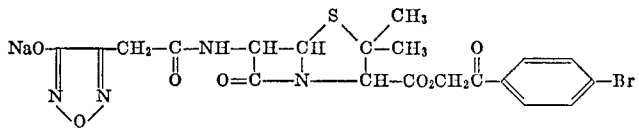

The entire 5 g. was dissolved in 50 ml. DMF and 1.32 g. of sodium thiophenoxide was added with stirring. After 10 minutes the mixture was poured onto 300 ml. ethyl acetate with vigorous stirring. The resulting precipitate was collected by filtration, washed with ethyl acetate (5× 50 ml.) and air-dried. The solid product was then slurried for 30 minutes in 200 ml. isopropanol, filtered, washed with isopropanol and Skellysolve B (petroleum ether, B.P. 60–68° C.). The yield of disodium 6-(3-hydroxy-4-furazanacetamido)penicillanate was 3.8 g. when vacuum-dried over $P_2O_5$.

*Analysis.*—Calc'd for $C_{12}H_{12}N_4O_6S \cdot 2Na$ (percent): C, 37.40; H, 3.14; N, 14.51. Found (percent): C, 38.65; H, 3.46; N, 12.94. Karl Fisher $H_2O$=6.60%.

Procedure No. 17

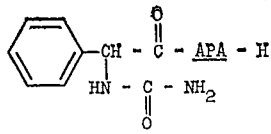

D(—)-α-ureidophenylacetic acid: This compound has been reported by Dakin and Dudley [J. Biol. Chem. 18, 49 (1914)]. The following procedure, which is somewhat different than described by these authors, was used.

A suspension of 50 g. (0.33 mole) of D(—)-α-aminophenylacetic acid in 900 ml. of water was heated to 90° and a solution of 32.4 g. (0.400 mole) potassium cyanate in 100 ml. water was added with stirring over a period of about 20 minutes. The resulting clear solution was cooled to about 25° and stirred for 4 hours. After acidification to pH 4 with 6 N hydrochloric acid the precipitate of product was collected by filtration. Recrystallization from 1.5 liters of water gave 43.6 g. of D(—)-α-ureidophenylactic acid; M.P. 193–195° dec. $[\alpha]_D$ —136.7° (c.=1 in 1 N ammonium hydroxide).

p-Bromophenacyl 6-aminopenicillanate: A mixture of 6.5 g. p-bromophenacyl 6-aminopenicillanate p-toluenesulfonate in a mixture of water and ethyl acetate was made basic with saturated aqueous sodium bicarbonate solution. The ethyl acetate phase was separated, washed twice with water, dried with anhydrous sodium sulfate, and the solvent removed at reduced pressure to give p-bromophenacyl 6-aminopenicillanate as a yellow oil.

p-Bromophenacyl 6 - [D(—)-α-ureidophenylacetamido] penicillanate: The p-bromophenacyl 6-aminopenicillanate obtained above was dissolved in 65 ml. of tetrahydrofuran. 1-cyclohexyl-3-(2 - morpholinyl - (4) - ethyl)carbodiimide metho-p-toluenesulfonate (4.23 g., 0.0100 mole) was added followed by 45 ml. of dimethylformamide with stirring to give a solution. The solution was cooled in an ice bath and 1.94 g. (0.010 mole) of D(—)-α-ureidophenylacetic acid added with vigorous stirring, a clear solution resulting. The ice bath was removed and the reaction mixture stirred for two hours. The reaction mixture was filtered to remove the crystalline solid which had formed. The filtrate was distilled on a rotary flash evaporator until most of the tetrahydrofuran had been removed. Methylene chloride was added to the residue and the resulting solution extracted 3 times with water, once with aqueous sodium bicarbonate, and then twice more with water. The dried (anhydrous sodium sulfate) methylene chloride phase was partially evaporated on the rotary flash evaporator transforming the remaining material into a thick gel. This residue was triturated with anhydrous ether giving, after filtration and drying in vacuo, 4.1 g. of p-bromophenacyl 6-[D(—) - α - ureidophenylacetamido]penicillanate.

6-[D(—)-α - ureidophenylacetamido]penicillanate acid: A solution of 1.87 g. (0.0143 mole) of sodium thiophenoxide in 25 ml. of dimethylformamide was added in one portion to a solution of 4.1 g. (0.0071 mole) p-bromophenacyl 6-[D(—)-α-ureidopenicillanate in 25 ml. dimethylformamide with brief cooling. The reaction mixture was stored at room temperature for 20 minutes, diluted with 250 ml. water with cooling and extracted twice with methyl isobutyl ketone and once with ethyl acetate. The aqueous phase was layered with ethyl acetate and made strongly acidic with 42% phosphoric acid. A second extraction with ethyl acetate was made. The combined ethyl acetate extracts containing the acid form of the penicillin were dried with anhydrous sodium sulfate and treated with 2.4 ml. (0.007 mole) sodium 2-ethylhexanoate in 1-butanol causing an oil to separate. The resulting mixture was then distilled on the rotary flash evaporator to remove water as the azeotrope with ethyl acetate, fresh ethyl acetate being added as needed to maintain volume. The ethyl acetate was decanted from the partially-solidified mass, the residue being triturated with acetone and the resulting solid collectced by filtration. There was obtained 2.6 g. of sodium 6-[D(—)-α-ureidophenylacetamido]penicillanate.

The sodium salt was dissolved in 60 ml. water, the solution filtered and acidified with 42% phosphoric acid to give crystalline 6-[D(—)-α-ureidophenylacetamido] penicillanic acid; wt. 1.30 g., M.P. 174–179° dec. The IR and NMR spectra are consistent with the structure.

*Analysis.*—Calc'd for $C_{17}H_{20}N_4O_5S$ (percent): C, 52.03; H, 5.14; N, 14.28. Found (percent): C, 51.62, 51.78; H, 5.13, 5.18; N, 13.97.

This product in vitro exhibited Minimum Inhibitory Concentrations of 0.25 mcg./ml. vs. *Staphylococcus aureus* Smith and of 25–100 mcg./ml. vs. the benzylpenicillin-resistant *S. aureus* BX–1633–2 and of 1.6–3.1 mcg./ml. vs. *Shigella sonnei* and of about 0.8 mcg./ml. vs. *Salmonella enteritidis* and of about 3.1 mcg./ml. vs. *S. typhosa* and in mice vs. *S. aureus* Smith exhibited $CD_{50}$'s of about 1.1 mgm./kg. upon intramuscular administration.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:
1. Esters of 6-aminopenicillanic acid of the formula

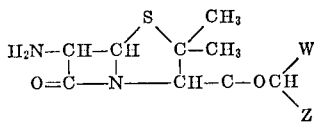

wherein, when W represents hydrogen, Z represents (lower)alkanoyl, benzoyl, naphthoyl, furoyl, thenoyl, nitrobenzoyl, methylbenzoyl, halobenzoyl, phenylbenzoyl, N-phthalimido, N-succinimido, N-saccharino, N-(lower) alkylcarbamoyl, (lower)alkoxy, (lower)alkylthio, phenoxy, carbalkoxy, carbobenzoxy, carbamoyl, benzyloxy, chlorobenzyloxy, carbophenoxy, carbo-tert. butoxy or (lower)alkylsulfonyl, and when W represents carbalkoxy, Z represents carbalkoxy and, when W represents phenyl, Z represents benzoyl or cyano or wherein W and Z taken together represent 2-oxocycloalkyl containing 4 to 8 carbon atoms inclusive; and acid addition salts thereof.

2. Esters of 6-aminopenicillanic acid of the formula

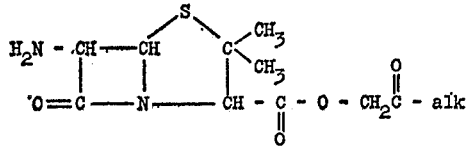

wherein alk represents (lower)alkyl.

3. Acid addition salts of esters of 6-aminopenicillanic acid of the formula

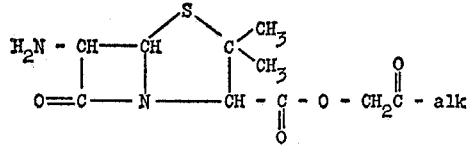

wherein alk represents (lower)alkyl.

4. Esters of 6-aminopenicillanic acid of the formula

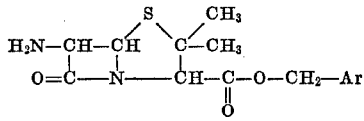

wherein Ar represents benzoyl, naphthoyl, furoyl, thenoyl, nitrobenzyl, halobenzoyl, methylbenzoyl, methanesulfonyl benzoyl or phenylbenzoyl and acid addition salts thereof.

5. The compound of the formula

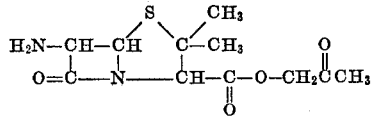

and acid addition salts thereof.

6. The compound of the formula

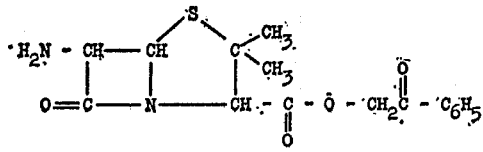

and acid addition salts thereof.

7. The compound of the formula

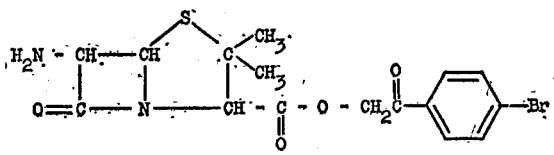

and acid addition salts thereof.

8. The compound of the formula

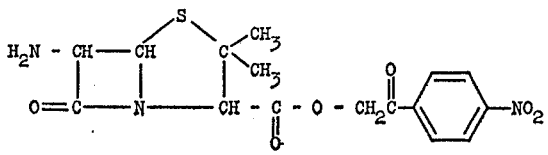

and acid addition salts thereof.

9. The compound of the formula

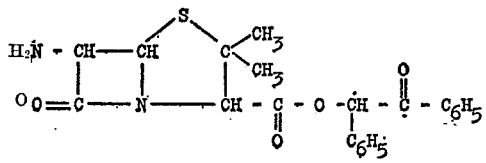

and acid addition salts thereof.

10. The compound of the formula

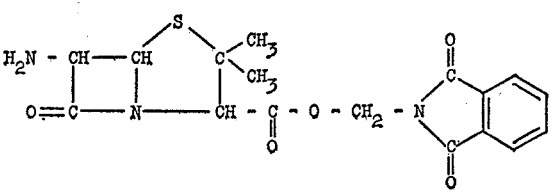

and acid addition salts thereof.

11. 6-aminopenicillanic acid esters of the formula:

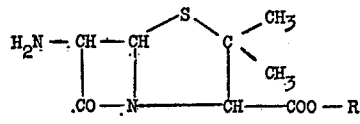

wherein R is a radical selected from the group consisting of unsubstituted and substituted phenacyl radicals, said substituted phenacyl radicals containing at least one member selected from the group consisting of halide, lower alkyl and nitro radicals.

12. Hydrochloric acid addition salts of the 6-aminopenicillanic acid esters set forth in claim 11.

13. p-Toluene sulfonic acid addition salts of the 6-aminopenicillanic acid esters set forth in claim 11.

References Cited

UNITED STATES PATENTS 3,257,411   6/1966   Patchett et al. _____ 260—239.1

NICHOLAS S. RIZZO, Primary Examiner

U.S. Cl. X.R.

260—239.1, 243 C; 424—271

UNITED STATES PATENT OFFICE
CERTIFICATE OF CORRECTION

Patent No. 3,652,546           Dated March 28, 1972

Inventor(s) L. C. Cheney, J. C. Godfrey, L. B. Crast, Jr. and J. R. Luttinger

It is certified that error appears in the above-identified patent and that said Letters Patent are hereby corrected as shown below:

In claim 1, the formula should read as follows:

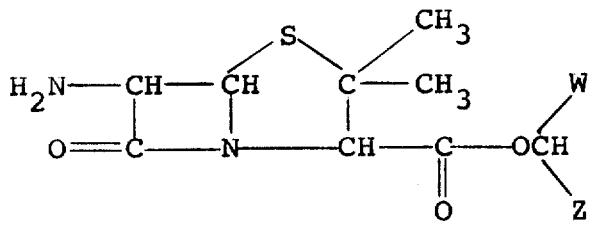

In claim 4, lines 34 and 35, the word "methanesulfonyl benzoyl" should read as one word: methanesulfonylbenzoyl.

In claim 9, the formula should read as follows:

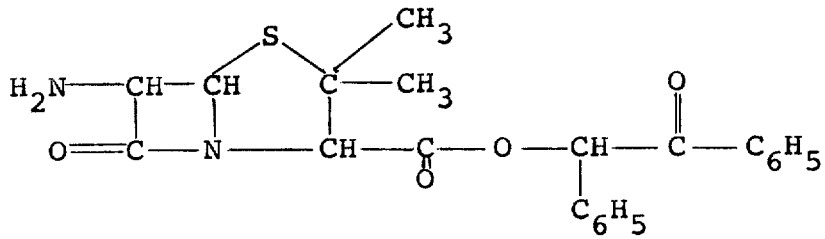

Signed and sealed this 26th day of September 1972.

(SEAL)
Attest:

EDWARD M. FLETCHER, JR.          ROBERT GOTTSCHALK
Attesting Officer                Commissioner of Patents